US011935469B2

(12) United States Patent
Feng et al.

(10) Patent No.: US 11,935,469 B2
(45) Date of Patent: Mar. 19, 2024

(54) PIXEL CIRCUIT ARRAY AND DRIVING METHOD THEREOF, DISPLAY PANEL AND DRIVING METHOD THEREOF

(71) Applicants: Hefei BOE Joint Technology Co., Ltd., Hefei (CN); BOE TECHNOLOGY GROUP CO., LTD., Beijing (CN)

(72) Inventors: Xuehuan Feng, Beijing (CN); Yongqian Li, Beijing (CN); Pan Xu, Beijing (CN); Zhongyuan Wu, Beijing (CN)

(73) Assignees: Hefei BOE Joint Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/620,195

(22) PCT Filed: Dec. 23, 2020

(86) PCT No.: PCT/CN2020/138623
§ 371 (c)(1),
(2) Date: Dec. 17, 2021

(87) PCT Pub. No.: WO2022/133803
PCT Pub. Date: Jun. 30, 2022

(65) Prior Publication Data

US 2022/0406252 A1 Dec. 22, 2022

(51) Int. Cl.
*G09G 3/3275* (2016.01)
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0426* (2013.01);
(Continued)

(58) Field of Classification Search
CPC .. G09G 3/3275; G09G 3/3266; G09G 3/3233; G09G 2320/0295; G09G 2300/0426
See application file for complete search history.

(56) References Cited

U.S. PATENT DOCUMENTS

2017/0206833 A1* 7/2017 Lee .......................... G09G 3/32
2020/0212137 A1* 7/2020 Wang ................. H10K 59/1213
(Continued)

FOREIGN PATENT DOCUMENTS

CN 109243347 A 1/2019
CN 110956911 A 4/2020
(Continued)

*Primary Examiner* — Dennis P Joseph
(74) *Attorney, Agent, or Firm* — HOUTTEMAN LAW LLC

(57) ABSTRACT

A pixel circuit array, a display panel, a method for driving a pixel circuit array, and a method for driving a display panel are provided. The pixel circuit array may include: a first signal sensing line (SENSE1) and a second signal sensing line (SENSE2); and N pixel circuits arranged in a column. All of the N pixel circuits are divided into a first group and a second group, each pixel circuit in the first group is coupled to the first signal sensing line (SENSE1), and each pixel circuit in the second group is coupled to the second signal sensing line (SENSE2) different from the first signal sensing line (SENSE1), where N is a positive integer greater than 1.

19 Claims, 10 Drawing Sheets

(52) U.S. Cl.
CPC ............... *G09G 2300/0842* (2013.01); *G09G 2300/0861* (2013.01); *G09G 2320/0233* (2013.01); *G09G 2320/0257* (2013.01)

(56) References Cited

U.S. PATENT DOCUMENTS

| | | | | |
|---|---|---|---|---|
| 2020/0234647 | A1* | 7/2020 | Lin | G09G 3/3266 |
| 2020/0234651 | A1 | 7/2020 | Liu et al. | |
| 2021/0225955 | A1 | 7/2021 | Yuan et al. | |
| 2021/0241663 | A1 | 8/2021 | Li et al. | |

FOREIGN PATENT DOCUMENTS

| | | | |
|---|---|---|---|
| CN | 110956928 | A | 4/2020 |
| CN | 210984239 | U | 7/2020 |
| KR | 20170040866 | A | 4/2017 |

* cited by examiner

PIXEL CIRCUIT ARRAY AND DRIVING METHOD THEREOF, DISPLAY PANEL AND DRIVING METHOD THEREOF

CROSS-REFERENCE TO RELATED APPLICATIONS

This is a National Phase Application filed under 35 U.S.C. 371 as a national stage of PCT/CN2020/138623 filed on Dec. 23, 2020, the content of which is incorporated herein by reference in its entirety.

TECHNICAL FIELD

The present disclosure relates to, but is not limited to, the technical field of Organic Light Emitting Diode (OLED) display, and in particular, to a pixel circuit array, a display panel, a method for driving a pixel circuit array, and a method for driving a display panel.

BACKGROUND

In a process of displaying a picture (which is, for example, text, an image, a combination of text and an image, and the like) by a display panel such as an OLED display panel, a phenomenon of image ghosting (also referred to as moving picture ghosting or moving image ghosting) may occur during switching of moving pictures. That is, when the display panel switches one frame of picture to another frame of picture, a user may simultaneously observe information of both frames of picture, making display of details and outlines of the current picture (i.e., the another frame of picture) unclear (or blurred), thereby degrading the display effect of the display panel. Therefore, it is desirable to mitigate or eliminate the phenomenon of moving picture ghosting.

SUMMARY

A first aspect of the present disclosure provides a pixel circuit array, including:

a first signal sensing line and a second signal sensing line; and

N pixel circuits arranged in a column;

wherein all of the N pixel circuits are divided into a first group and a second group, each pixel circuit in the first group is coupled to the first signal sensing line, and each pixel circuit in the second group is coupled to the second signal sensing line different from the first signal sensing line, where N is a positive integer greater than 1.

In an embodiment, the first group includes 1-st to (N/S)-th pixel circuits of the N pixel circuits, and the second group includes ((N/S)+1)-th to N-th pixel circuits of the N pixel circuits, wherein S is a factor of N.

In an embodiment, the first group includes the pixel circuits in odd rows of the N pixel circuits, and the second group includes the pixel circuits in even rows of the N pixel circuits, where N is an even number.

In an embodiment, N is an even number, and S is equal to 2.

In an embodiment, each of the N pixel circuits includes a light emitting device and a light emission control circuit, and the light emission control circuit is configured to control the light emitting device to emit light or not.

In an embodiment, the light emitting device is an organic light emitting diode.

In an embodiment, the light emission control circuit includes a display switching transistor, a driving transistor, a sensing switching transistor, and a storage capacitor which are coupled together.

In an embodiment, each of the display switching transistor, the driving transistor, and the sensing switching transistor includes a control electrode, a first electrode, and a second electrode, the second electrode of the display switching transistor is coupled to the control electrode of the driving transistor, the first electrode of the driving transistor is configured to be coupled to a high level terminal, the second electrode of the driving transistor is coupled to the first electrode of the sensing switching transistor, and the second electrode of the sensing switching transistor is coupled to the first signal sensing line or the second signal sensing line.

In an embodiment, a first terminal of the storage capacitor is coupled to the second electrode of the display switching transistor and the control electrode of the driving transistor, respectively, a second terminal of the storage capacitor is coupled to the second electrode of the driving transistor, the first electrode of the sensing switching transistor, and an anode of the organic light emitting diode, respectively, and a cathode of the organic light emitting diode is configured to be coupled to a low level terminal.

In an embodiment, the pixel circuit array further includes a data line, a first gate line, and a second gate line, wherein the first electrode of the display switching transistor is coupled to the data line, the control electrode of the display switching transistor is coupled to the first gate line, and the control electrode of the sensing switching transistor is coupled to the second gate line.

In an embodiment, each of the display switching transistor, the driving transistor, and the sensing switching transistor is an N-type transistor or a P-type transistor.

In an embodiment, each of the first signal sensing line and the second signal sensing line extends through a region in which all of the N pixel circuits are located.

In an embodiment, the first signal sensing line extends through a region in which the 1-st to (N/S)-th pixel circuits are located, and the second signal sensing line extends through a region in which the ((N/S)+1)-th to N-th pixel circuit are located.

A second aspect of the present disclosure provides a display panel, which includes a gate driving circuit and M pixel circuit arrays, wherein each of the M pixel circuit arrays is the pixel circuit array according to any one of the foregoing embodiments of the first aspect of the present disclosure, and the M pixel circuit arrays including M columns of pixel circuits and N rows of pixel circuits, M being a positive integer.

In an embodiment, the gate driving circuit is configured to: drive the pixel circuits in the second group not to emit light during driving the pixel circuits in the first group to display an image; or drive the pixel circuits in the first group not to emit light during driving the pixel circuits in the second group to display an image.

In an embodiment, N is an even number, and the gate driving circuit is configured to: drive the pixel circuits in ((N/2)+1)-th to N-th rows not to emit light during driving the pixel circuits in 1-st to (N/2)-th rows to display the image; or drive the pixel circuits in 1-st to (N/2)-th rows not to emit light during driving the pixel circuits in ((N/2)+1)-th to N-th rows to display the image.

In an embodiment, the gate driving circuit includes N gate driving units cascaded together, the N gate driving units are in one-to-one correspondence with the N rows of pixel circuits, and the N gate driving units are coupled to the N rows of pixel circuits, respectively.

In an embodiment, the control electrodes of the display switching transistors of the pixel circuits in a same row of the N rows of pixel circuits are all coupled to a same first gate line, and the control electrodes of the sensing switching transistors of the pixel circuits in a same row of the N rows of pixel circuits are all coupled to a same second gate line.

In an embodiment, each of the N gate driving units includes a signal input terminal, a cascade output terminal, a first signal output terminal, and a second signal output terminal; and the signal input terminal of each of the gate driving unit in a first stage and the gate driving unit in a second stage is coupled to a frame start signal input line, the signal input terminal of the gate driving unit in an i-th stage is coupled to the cascade output terminal of the gate driving unit in an (i−2)-th stage, and the first signal output terminal and the second signal output terminal of each of the N gate driving units are coupled to the first gate line and the second gate line of each pixel circuit in a corresponding row, where $3 \leq i \leq N$.

A third aspect of the present disclosure provides a method for driving a pixel circuit array, wherein the pixel circuit array is the pixel circuit array according to any one of the foregoing embodiments of the first aspect of the present disclosure, the 1-st to (N/2)-th pixel circuit are located in an upper half screen, the ((N/2)+1)-th to N-th pixel circuits are located in a lower half screen, and the method includes:

providing a turn-on level to the first gate line and the second gate line of each pixel circuit in one of the upper half screen and the lower half screen, respectively, to turn on both the display switching transistor and the sensing switching transistor, so as to input a data voltage provided by the data line to the control electrode of the driving transistor via the display switching transistor, and to input a low level provided by a corresponding one of the first signal sensing line and the second signal sensing line to the second electrode of the driving transistor;

providing a turn-off level to the first gate line and the second gate line of each pixel circuit in the one of the upper half screen and the lower half screen, respectively, to turn off both the display switching transistor and the sensing switching transistor, thereby causing the organic light emitting diode to start light emission; and during providing the turn-on level to the first gate line and the second gate line of each pixel circuit in the one of the upper half screen and the lower half screen, respectively, providing a turn-on level to the first gate line and the second gate line of each pixel circuit in the other of the upper half screen and the lower half screen to allow the data voltage provided by the data line to be input to the control electrode of the driving transistor via the display switching transistor, and allow a reference voltage provided by a corresponding one of the first and second signal sensing lines to be input to the second electrode of the driving transistor, wherein the reference voltage is higher than the data voltage to make the organic light emitting diode of each pixel circuit in the other of the upper half screen and the lower half screen not emit light.

In an embodiment, each of the display switching transistor, the driving transistor, and the sensing switching transistor is an N-type transistor, the turn-on level is a high level, and the turn-off level is a low level.

A fourth aspect of the present disclosure provides a method for driving a display panel, wherein the display panel is the display panel according to any one of the foregoing embodiments of the second aspect of the present disclosure, the 1-st to (N/2)-th rows of pixel circuits of the N rows of pixel circuits are located in an upper half screen, the ((N/2)+1)-th to N-th rows of pixel circuits of the N rows of pixel circuits are located in a lower half screen, and the method includes:

providing a turn-on level to the first gate line and the second gate line of each row of pixel circuits in one of the upper half screen and the lower half screen, respectively, to turn on both the display switching transistor and the sensing switching transistor, so as to input a data voltage provided by the data line to the control electrode of the driving transistor via the display switching transistor, and to input a low level provided by a corresponding one of the first signal sensing line and the second signal sensing line to the second electrode of the driving transistor;

providing a turn-off level to the first gate line and the second gate line of each row of pixel circuits in the one of the upper half screen and the lower half screen, respectively, to turn off both the display switching transistor and the sensing switching transistor, thereby causing the organic light emitting diode to start light emission; and during providing the turn-on level to the first gate line and the second gate line of each row of pixel circuits in the one of the upper half screen and the lower half screen, respectively, providing a turn-on level to the first gate line and the second gate line of each row of pixel circuits in the other of the upper half screen and the lower half screen, respectively, to allow the data voltage provided by the data line to be input to the control electrode of the driving transistor via the display switching transistor, and allow a reference voltage provided by a corresponding one of the first and second signal sensing lines to be input to the second electrode of the driving transistor, wherein the reference voltage is higher than the data voltage to make the organic light emitting diodes of a respective row of pixel circuits in the other of the upper half screen and the lower half screen not emit light.

In an embodiment, each of the display switching transistor, the driving transistor, and the sensing switching transistor is an N-type transistor, the turn-on level is a high level, and the turn-off level is a low level.

DETAILED DESCRIPTION

Figure 1:
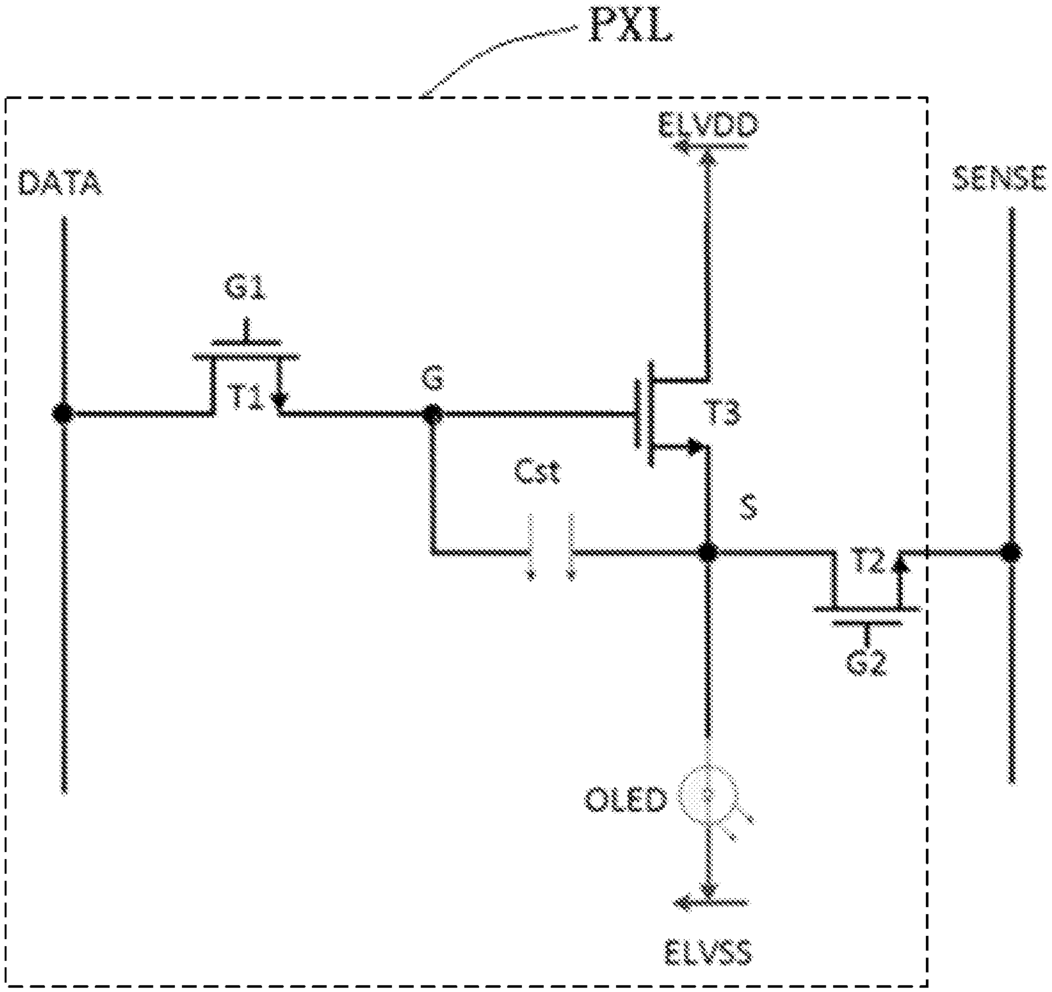
FIG. 1 is a schematic diagram showing a structure of a pixel circuit (i.e., a circuit of one pixel) according to an embodiment of the present disclosure.

To enable one of ordinary skill in the art to better understand technical solutions of the present disclosure, a pixel circuit array, a display panel, a method for driving a pixel circuit array, and a method for driving a display panel provided by the present disclosure will be described in further detail below with reference to the accompanying drawings and exemplary embodiments.

It will be understood that, although the terms "first", "second", "third", and the like may be used herein for describing various elements, these elements should not be limited by these terms. Instead, these terms are only used for distinguishing one element from another. For example, a first element may be termed a second element, a third element, or the like, and similarly, a second element may be termed a first element, a third element, or the like, without departing from the scope of the present disclosure.

Each transistor in the present disclosure may be an N-type Thin Film Transistor (TFT) such as an N-type Metal Oxide Semiconductor Field Effect Transistor (MOSFET), or may be a P-type TFT such as a P-type MOSFET. However, the present disclosure is not limited thereto, and for example, each transistor in the present disclosure may be an N-type or P-type low temperature polysilicon TFT. Each TFT is a three-electrode element including a gate electrode (which may be referred to as a control electrode), a source electrode, and a drain electrode. The source electrode is an electrode which supplies carriers to a transistor. In each TFT, carriers flow from the source electrode. The drain electrode is an electrode through which carriers exit from the TFT. That is, in the MOSFET, carriers flow from the source electrode to the drain electrode. In the case of an N-type TFT, carriers are electrons, and therefore, a voltage of the source electrode is lower than that of the drain electrode, so that electrons can flow from the source electrode to the drain electrode. In the N-type TFT, electrons flow from the source electrode to the drain electrode, and thus a current flows from the drain electrode to the source electrode. In contrast, in the case of a P-type TFT (e.g., a P-type MOSFET), since carriers are holes, a voltage of the source electrode is higher than that of the drain electrode, so that holes can flow from the source electrode to the drain electrode. In the P-type TFT, since holes flow from the source electrode to the drain electrode, a current flows from the source electrode to the drain electrode. It should be understood that the source and drain electrodes of the MOSFET may not be fixed. For example, the source and drain electrodes of the MOSFET may vary depending on the applied voltage. Therefore, in the description of an embodiment of the present disclosure, one of the source and drain electrodes is referred to as a first electrode and the other of the source and drain electrodes is referred to as a second electrode. In the case of an N-type transistor, a turn-on level is a high level and a turn-off level is a low level. In the case of a P-type transistor, a turn-on level is a low level and a turn-off level is a high level. In the following description, an example in which each transistor is an N-type transistor is taken, otherwise further explanation is provided.

FIG. 1 is a schematic diagram showing a structure of one pixel circuit (i.e., a circuit of one pixel) according to an embodiment of the present disclosure. It should be understood that in the present disclosure, each pixel circuit corresponds to or includes one pixel.

As shown in FIG. 1, the pixel circuit includes a light emitting device and a light emission control circuit, and the light emission control circuit may control the light emitting device to emit light or not. The light emitting device may be an organic light emitting diode OLED. The light emission control circuit may include a display switching transistor T1, a sensing switching transistor T2, a driving transistor T3, and a storage capacitor Cst, which are coupled together. Each of the display switching transistor T1, the driving transistor T3, and the sensing switching transistor T2 includes a control electrode, a first electrode, and a second electrode. The second electrode of the display switching transistor T1 is coupled to the control electrode of the driving transistor T3, and the first electrode of the driving transistor T3 is coupled to a high level terminal ELVDD. The second electrode of the driving transistor T3 is coupled to the first electrode of the sensing switching transistor T2, and the second electrode of the sensing switching transistor is coupled to a signal sensing line SENSE (which may be a first signal sensing line SENSE1 or a second signal sensing line SENSE2, which will be further described below). A first terminal of the storage capacitor Cst may be coupled to the second electrode of the display switching transistor T1 and the control electrode of the driving transistor T3 at a node G, respectively, and a second terminal of the storage capacitor Cst may be coupled to the second electrode of the driving transistor T3, the first electrode of the sensing switching transistor T2 and an anode of the organic light emitting diode OLED at a node S, respectively. Further, a cathode of the organic light emitting diode OLED is coupled to a low level terminal ELVSS. An array including the pixel circuit array may further include a data line DATA, a first gate line G1, and a second gate line G2. The first electrode of the display switching transistor T1 is coupled to the data line DATA, and the control electrode of the display switching transistor is coupled to the first gate line G1. Further, the control electrode of the sensing switching transistor is coupled to the second gate line G2.

When external compensation needs to be performed on the pixel circuit, an operation process of the pixel circuit may include at least the following two phases (or stages) which are a pixel driving phase (including a data voltage writing process) and a pixel sensing phase (including a current reading process).

In the pixel driving phase, a data voltage (which may also be referred to as a data level or a data signal) VDATA supplied from the data line DATA may be written into a pixel. In the pixel sensing phase, a reference voltage VREF provided by the signal sensing line SENSE may be written into the pixel, and an electric signal at the second electrode (e.g., a source electrode) of the driving transistor T3 is read to the signal sensing line SENSE through the sensing switching transistor T2 to detect a degree of shift of a threshold voltage of the driving transistor T3 and perform external compensation for the threshold voltage, thereby eliminating the brightness non-uniformity of the pixel caused by the shift of the threshold voltage of the driving transistor T3. During both the data voltage writing process and the current reading process, a turn-on level (which may also be referred to as a valid level) needs to be input to the control electrode of the sensing switching transistor T2 through the corresponding gate line G2 to turn on the sensing switching transistor T2. It should be noted that the method of external compensation of a pixel unit of an OLED display panel is conventional in the art, and thus detailed description thereof is omitted herein.

The inventors of the present inventive concept have found that, moving picture ghosting will occur during the operation of a pixel circuit array in the related art. That is, when a display panel including the pixel circuit array switches from one frame of picture to another frame of picture, a user may simultaneously observe information of the one frame of picture and the another frame of picture. In general, the higher a refresh frequency of the display panel is, the less noticeable the moving picture ghosting is. In other words, a Moving Picture Response Time (MPRT) may be shortened to mitigate moving picture ghosting, and a shorter MPRT will result in less noticeable moving picture ghosting. The conventional method of shortening the MPRT is to increase the refresh frequency of the display panel. However, the increase in the refresh frequency of the display panel is limited by a performance of the display panel and a performance of a graphic card controlling the display panel. Therefore, the moving picture ghosting cannot be effectively or significantly mitigated.

Some embodiments of the present disclosure provide a pixel circuit array, a display panel, a method for driving a pixel circuit array, and a method for driving a display panel, all of which can shorten the MPRT by shortening a light emitting time duration of each pixel without increasing a refresh frequency of the display panel, thereby effectively or significantly mitigating the moving picture ghosting, as will be further described below.

Figure 2:
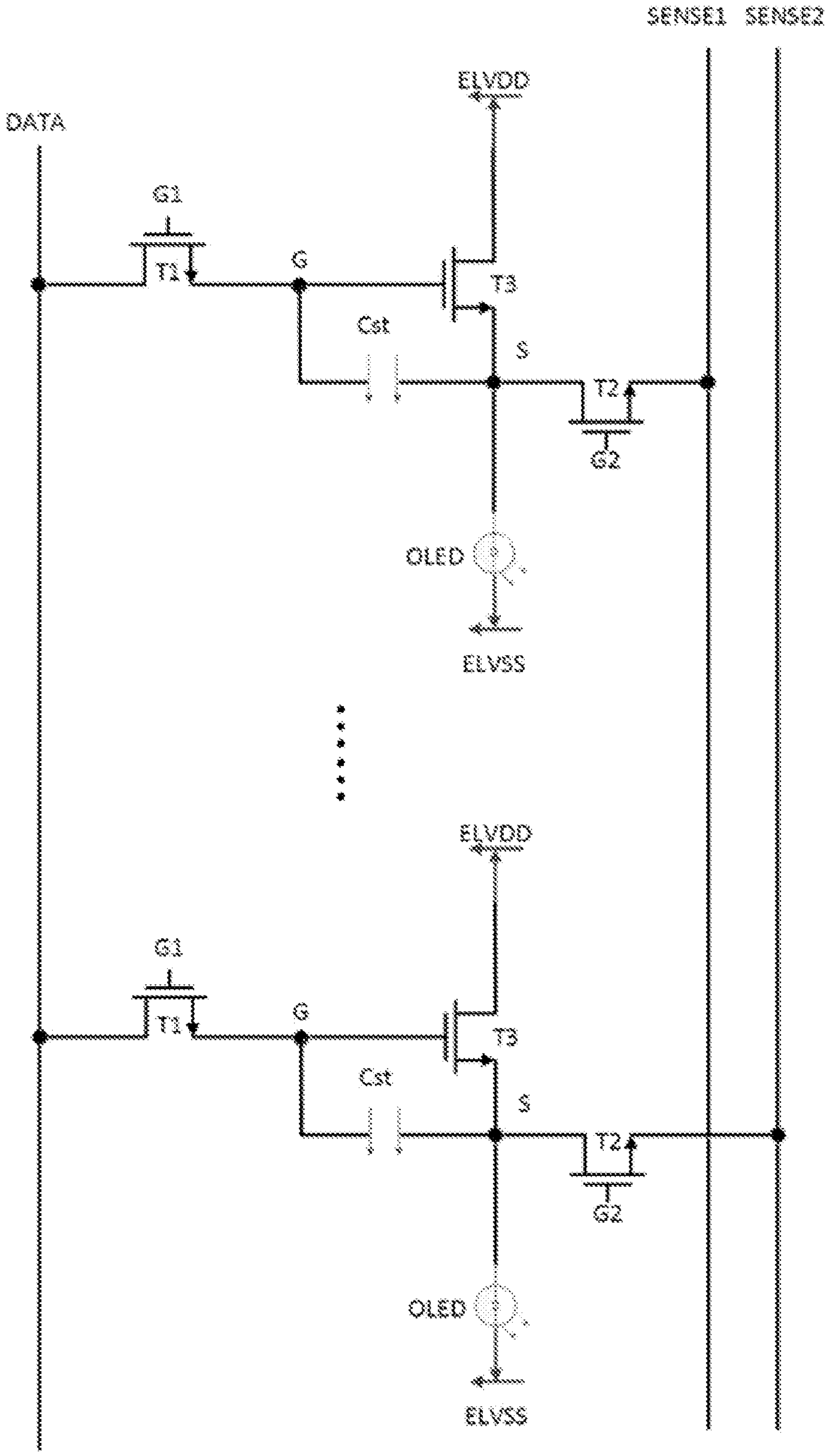
FIG. 2 is a schematic diagram showing a structure of a pixel circuit array (i.e., an array of pixel circuits) according to an embodiment of the present disclosure.

An embodiment of the present disclosure provides a pixel circuit array, and FIG. 2 is a schematic diagram showing a structure of a column of pixel circuits in the pixel circuit array. It should be understood that each column of pixel circuits in the pixel circuit array is also a pixel circuit array, as shown in FIG. 2.

The pixel circuit array may include M columns and N rows of pixel circuits, where M is a positive integer, and N is a positive integer and an even number. Each of the pixel circuits in the M column and the N row may be the pixel circuit shown in FIG. 1.

As shown in FIG. 2, all of the N pixel circuits in each column of the pixel circuit array are divided into a first group and a second group, where N is an integer greater than 1. In other words, a sum of the number of pixel circuits in the first group and a number of pixel circuits in the second group is equal to N. The second electrode of the sensing switching transistor T2 of each pixel circuit in the first group is coupled to a first signal sensing line SENSE1. The second electrode of the sensing switching transistor T2 of each pixel circuit in the second group is coupled to a second signal sensing line SENSE2.

In an embodiment, the first group includes the 1-st through the (N/2)-th pixel circuits in each column of the pixel circuit array (i.e., includes the pixel circuits located in an upper half screen), and the second group includes the ((N/2)+1)-th through the N-th pixel circuits in each column of the pixel circuit array (i.e., includes the pixel circuits located in a lower half screen), where N is a positive integer and is an even number. In this case, the second electrode of the sensing switching transistor T2 of each pixel circuit in the first group being coupled to the first signal sensing line SENSE1 means that, the second electrodes of the sensing switching transistors T2 of the 1-st to the (N/2)-th pixel circuits in each column of the pixel circuit array (i.e., the pixel circuits located in the upper half screen) are all coupled to the first signal sensing line SENSE1. The second electrode of the sensing switching transistor T2 of each pixel circuit in the second group being coupled to the second signal sensing line SENSE2 means that, the second electrodes of the sensing switching transistors T2 of the ((N/2)+1)-th to the N-th pixel circuits in each column of the pixel circuit array (i.e., the pixel circuits located in the lower half screen) are all coupled to the second signal sensing line SENSE2.

In an embodiment, the first group includes the 1-st through the (N/3)-th pixel circuits in each column of the pixel circuit array, and the second group includes the ((N/3)+1)-th through the N-th pixel circuits in each column of the pixel circuit array, where N is a positive integer greater than 1 and (N/3) is an integer. In this case, the second electrode of the sensing switching transistor T2 of each pixel circuit in the first group being coupled to the first signal sensing line SENSE1 means that, the second electrodes of the sensing switching transistors T2 of the 1-st to the (N/3)-th pixel circuits in each column of the pixel circuit array (i.e., the pixel circuits located in an upper ⅓ screen) are all coupled to the first signal sensing line SENSE1. The second electrode of the sensing switching transistor T2 of each pixel circuit in the second group being coupled to the second signal sensing line SENSE2 means that, the second electrodes of the sensing switching transistors T2 of the ((N/3)+1)-th to the N-th pixel circuits in each column of the pixel circuit array (i.e., the pixel circuits located in a lower ⅔ screen) are all coupled to the second signal sensing line SENSE2.

In an embodiment, the first group includes the 1-st through the (N/S)-th pixel circuits in each column of the pixel circuit array, and the second group includes the ((N/S)+1)-th through the N-th pixel circuits in each column of the pixel circuit array, where N is a positive integer greater than 1, and S is a factor of N (in other words, N is an integer multiple of S, or S is a divisor that divides N without a remainder). In this case, the second electrode of the sensing switching transistor T2 of each pixel circuit in the first group being coupled to the first signal sensing line SENSE1 means that, the second electrodes of the sensing switching transistors T2 of the 1-st to the (N/S)-th pixel circuits in each column of the pixel circuit array are all coupled to the first signal sensing line SENSE1. The second electrode of the sensing switching transistor T2 of each pixel circuit in the second group being coupled to the second signal sensing line SENSE2 means that, the second electrodes of the sensing switching transistors T2 of the ((N/S)+1)-th to the N-th pixel circuits in each column of the pixel circuit array are all coupled to the second signal sensing line SENSE2. For example, in a case where N is equal to 540 or an integer multiple of 540, S may be 2, 3, 4, 5, 6, 9, 10, 15, 18, 20, 27, 30, 36, 60, 180, or the like.

In an embodiment, the first group includes the pixel circuits in odd rows (e.g., the 1-st, 3-rd, 5-th, . . . , and (N−1)-th pixel circuits) and in each column of the pixel circuit array, and the second group includes the pixel circuits in even rows (e.g., the 2-nd, 4-th, 6-th, . . . , and N-th pixel circuits) and in each column of the pixel circuit array, where N is a positive integer and is an even number. In this case, the second electrode of the sensing switching transistor T2 of each pixel circuit in the first group being coupled to the first signal sensing line SENSE1 means that, the second electrodes of the sensing switching transistors T2 of the pixel circuits in odd rows and in each column of the pixel circuit array are all coupled to the first signal sensing line SENSE1. The second electrode of the sensing switching transistor T2 of each pixel circuit in the second group being coupled to the second signal sensing line SENSE2 means that, the second electrodes of the sensing switching transistors T2 of the pixel circuits in even rows and in each column of the pixel circuit array are all coupled to the second signal sensing line SENSE2.

Several examples of the division of the first group and the second group are listed above, however, the present disclosure is not limited thereto. For example, one of ordinary skill in the art may adopt another dividing approach as desired to mitigate the phenomenon of moving picture ghosting based on the teachings of the present disclosure.

Figure 3A:
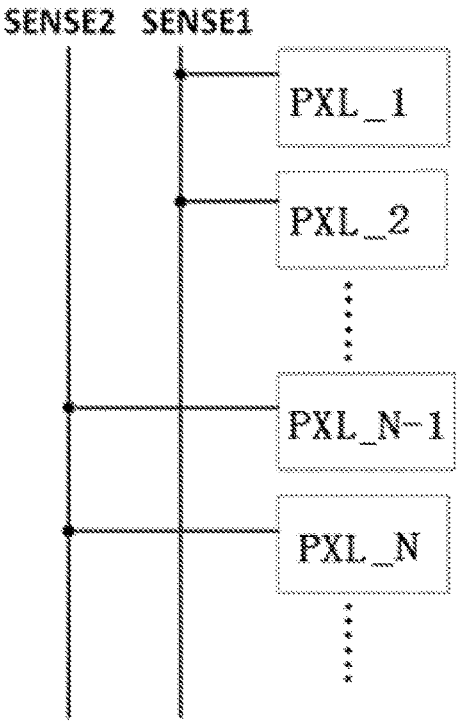
FIGS. 3A and 3B are schematic diagrams respectively showing two arrangements of a first signal sensing line and a second signal sensing line of the pixel circuit array shown in FIG. 2.
Figure 3B:
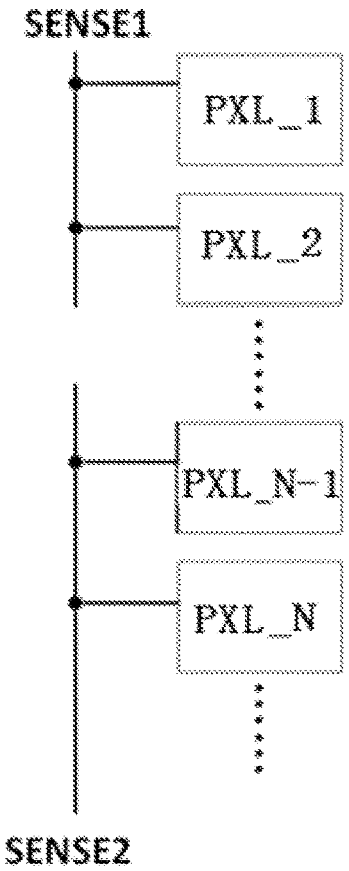

FIGS. 3A and 3B are schematic diagrams respectively showing two arrangements of the first signal sensing line SENSE1 and the second signal sensing line SENSE2 of the pixel circuit array shown in FIG. 2. It should be noted that the symbol "PXL" shown in FIGS. 3A and 3B represents a portion of the pixel circuit shown in FIG. 1 except the signal sensing line SENSE. As an example, FIGS. 3A and 3B respectively show that the first group includes a pixel PXL_, a pixel PXL_2, and the like, and the second group includes a pixel PXL_N−1, a pixel PXL_N, and the like.

It should be noted that the operating principle and driving method of the pixel array (i.e., the pixel circuit array) shown in FIG. 2 having the several dividing approaches of the first group and the second group as listed above, respectively, may be the same. For convenience of description, the following description will be made by taking as an example the dividing approach in which the first group includes the 1-st through the (N/2)-th pixel circuits in each column of the pixel circuit array (i.e., includes the pixel circuits located in the upper half screen), and the second group includes the ((N/2)+1)-th through the N-th pixel circuits in each column of the pixel circuit array (i.e., includes the pixel circuits located in the lower half screen).

As shown in FIG. 3A, each of the first and second signal sensing lines SENSE1 and SENSE2 of each column of pixel circuits may extend through a region in which all of the N pixel circuits are located (i.e., through both the upper half screen and the lower half screen). Such an arrangement allows the first signal sensing line SENSE1 and the second signal sensing line SENSE2 to have identical specifications (or characteristics), thereby reducing the difficulty of wiring. As shown in FIG. 3B, the first signal sensing line SENSE1 of each column of pixel circuits may extend through only a region in which the 1-st to (N/2)-th pixel circuits of the column of pixel circuits are located (i.e., through only the upper half screen), and the second signal sensing line SENSE2 of the column of pixel circuits may extend only through a region in which the ((N/2)+1)-th to N-th pixel circuits of the column of pixel circuits are located (i.e., through only the lower half screen). This arrangement can align the first signal sensing line SENSE1 and the second signal sensing line SENSE2 in a column direction (e.g., the vertical direction in FIG. 2) to reduce a space occupied by the first and second signal sensing lines SENSE1 and SENSE2 in a row direction (e.g., the horizontal direction in FIG. 2), thereby increasing the density of pixels. In addition, a length of each of the first and second signal sensing lines SENSE1 and SENSE2 can be reduced, thereby reducing non-uniformity in display brightness due to a resistance voltage drop (i.e., IR-Drop) across each of the first and second signal sensing lines SENSE1 and SENSE2.

As described above, pixel circuits in the column shown in FIG. 2 may include N pixel circuits, and the pixel circuit array may include M columns each of which is shown in FIG. 2. In other words, the pixel circuit array may include M columns of pixel circuits and N rows of pixel circuits, where M is a positive integer, and N is a positive integer and is an even number. Each of the pixel circuits in the M columns and the N rows may be the pixel circuit shown in FIG. 1.

Figure 4:
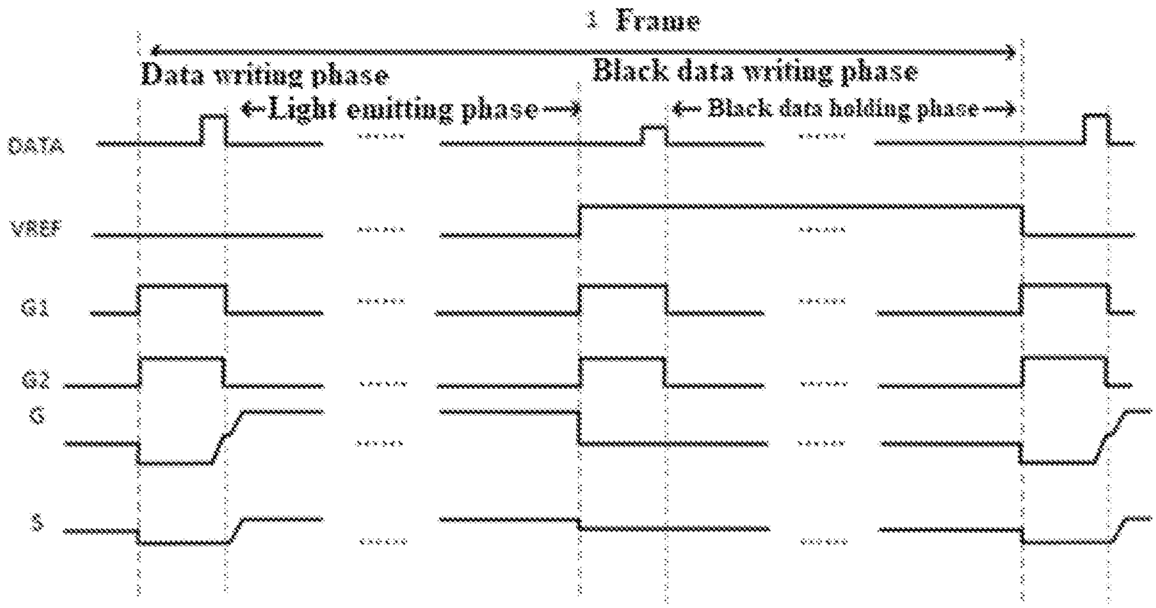
FIG. 4 is a timing diagram of displaying by each of pixel circuits of the pixel circuit array shown in FIG. 2.

FIG. 4 is a timing diagram of displaying by each of the pixel circuits of the pixel circuit array shown in FIG. 2. As shown in FIG. 4, the operation of each pixel circuit in one frame may include a display phase (which may last ½ frame) and a blanking phase (which may last ½ frame). The display phase may include a data writing phase and a light emitting phase, and the blanking phase may include a black data writing phase (which may also be referred to as a black picture writing phase) and a black data holding phase (which may also be referred to as a black picture holding phase). In the data writing phase, the display switching transistor T1 and the sensing switching transistor T2 of the pixel circuit are simultaneously turned on by being provided with a turn-on level through the first gate line G1 and the second gate line G2, respectively, to write a data signal provided by the data line DATA into the pixel circuits in each row. In the light emitting phase, the display switching transistor T1 and the sensing switching transistor T2 of the pixel circuit are simultaneously turned off by being provided with a turn-off level through the first gate line G1 and the second gate line G2, respectively, and at this time, the storage capacitor Cst may be bootstrapped to further increase the voltage of (or at) the node G (as shown in FIG. 4), so that the driving transistor T3 is turned on. As a result, a current flows from the high level terminal ELVDD to the low level terminal ELVSS via the driving transistor T3 and the organic light emitting diode OLED, thereby causing the organic light emitting diode OLED to emit light. In the black data writing phase, the display switching transistor T1 and the sensing switching transistor T2 of the pixel circuit are simultaneously turned on by being provided with a turn-on level through the first gate line G1 and the second gate line G2, respectively, to write a data signal (or data voltage) VDATA provided from the data line DATA to the node G of the pixel circuit and write a reference voltage VREF higher than the data voltage VDATA provided from the first signal sensing line SENSE1 or the second signal sensing line SENSE2 to the node S of the pixel circuit. At this time, a gate-source voltage Vgs of the driving transistor T3 satisfies the condition of $Vgs<0$, and thus the driving transistor T3 is turned off to make the organic light emitting diode OLED not emit light, thereby switching the pixel circuit to a black picture (which may be simply referred to as "switching to black"). The pixel circuit may be kept in a non-light emitting state (i.e., the black data holding phase) until the next frame starts.

Further, embodiments of the present disclosure provide a method for driving the pixel circuit array as shown in FIG. 2. As described above, the pixel circuits in the column shown in FIG. 2 includes N pixel circuits, where the 1-st pixel circuit to the (N/2)-th pixel circuit are located in the upper half screen, and the ((N/2)+1)-th pixel circuit to the N-th pixel circuit are located in the lower half screen. The method may include a step of providing (or supplying) a turn-on level to the first gate line G1 and the second gate line G2 of each pixel circuit in one of the upper half screen and the lower half screen, respectively, to turn on both the display switching transistor T1 and the sensing switching transistor T2, so that a data voltage supplied from the data line DATA is input to the control electrode of the driving transistor T3 via the display switching transistor T1, and a low level supplied from a corresponding one of the first signal sensing line SENSE1 and the second signal sensing line SENSE2 (e.g., the first signal sensing line SENSE1 for each pixel circuit in the upper half screen, and the second signal sensing line SENSE2 for each pixel circuit in the lower half screen) is input to the second electrode of the driving transistor T3. The method may further include a step of providing (or supplying) a turn-off level to the first gate line G1 and the second gate line G2 of each pixel circuit in the one of the upper half screen and the lower half screen, respectively, to turn off both the display switching transistor T1 and the sensing switching transistor T2, thereby causing the organic light emitting diode OLED to start light emission. The method may further include a step of, while the turn-off level is provided (or supplied) to the first gate line G1 and the second gate line G2 of each pixel circuit in the one of the upper half screen and the lower half screen, respectively, providing (or supplying) a turn-on level to the first gate line G1 and the second gate line G2 of each pixel circuit in the other of the upper half screen and the lower half screen, respectively, so that a data voltage VDATA supplied from the data line DATA is input to the control electrode of the driving transistor T3 via the display switching transistor T1, and a reference voltage VREF provided by a corresponding one of the first and second signal sensing lines SENSE1 and SENSE2 is input to the second electrode of the driving transistor T3, the reference voltage VREF is higher than the data voltage VDATA to make the organic light emitting diode OLED of each pixel circuit in the other one of the upper half screen and the lower half screen not emit light. In this way, the method can improve the MPRT of a display panel including the pixel circuit array shown in FIG. 2 by shortening a light emitting time duration of each pixel without increasing a refresh frequency of the display panel, thereby effectively mitigating the moving picture ghosting.

As described above, each of the display switching transistor T1, the driving transistor T3, and the sensing switching transistor T2 may be an N-type transistor. In this case, the turn-on level is a high level, and the turn-off level is a low level.

Figure 10:
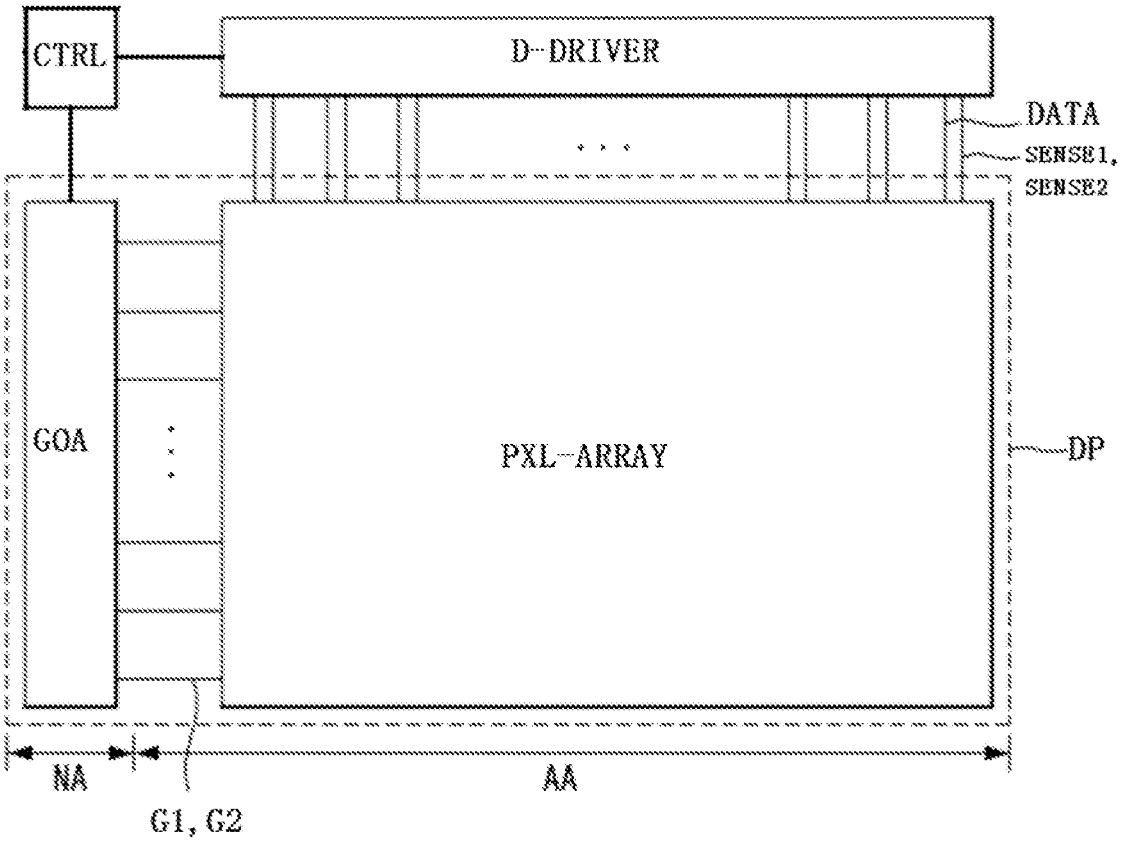
FIG. 10 is a schematic diagram showing a structure of a display device including a display panel according to an embodiment of the present disclosure.

An embodiment of the present disclosure provides a display panel as shown in FIG. 10. The display panel may include a gate driving circuit (which is also referred to as a Gate driver On Array (GOA)) and a pixel array PXL-ARRAY. The pixel array PXL-ARRAY may include M pixel circuit arrays each of which is as shown in FIG. 2, and the M pixel circuit arrays includes M columns of pixel circuits and N rows of pixel circuits, M being a positive integer, N being a positive integer and an even number. In an example, M is 1024 and N is 540 (i.e., the resolution of 1K). In an example, M is 2048 and N is 1080 (i.e., the resolution of 2K). In an example, M is 4096 and N is 2160 (i.e., the resolution of 4K). However, the present disclosure is not limited thereto, and M and N may take other suitable values, respectively.

For example, the gate driving circuit GOA is configured to: drive the pixel circuits in the ((N/2)+1)-th row to the N-th row not to emit light during driving the pixel circuits in the 1-st row to the (N/2)-th row to display a picture (or an image); alternatively, drive the pixel circuits in the 1-st row to the (N/2)-th row not to emit light during driving the pixel circuits in the ((N/2)+1)-th row to the N-th row to display a picture (or an image). Thus, the MPRT of the display panel can be improved by shortening a light emitting time duration of each pixel without increasing a refresh frequency of the display panel, thereby effectively mitigating the moving picture ghosting.

For example, the gate driving circuit GOA may include N gate driving units cascaded together, where the N gate driving units are in one-to-one correspondence with the N rows of pixel circuits, and the N gate driving units are coupled to the N rows of pixel circuits, respectively. Further, a structure of each of the gate driving units may be as shown in FIG. 5.

Figure 5:
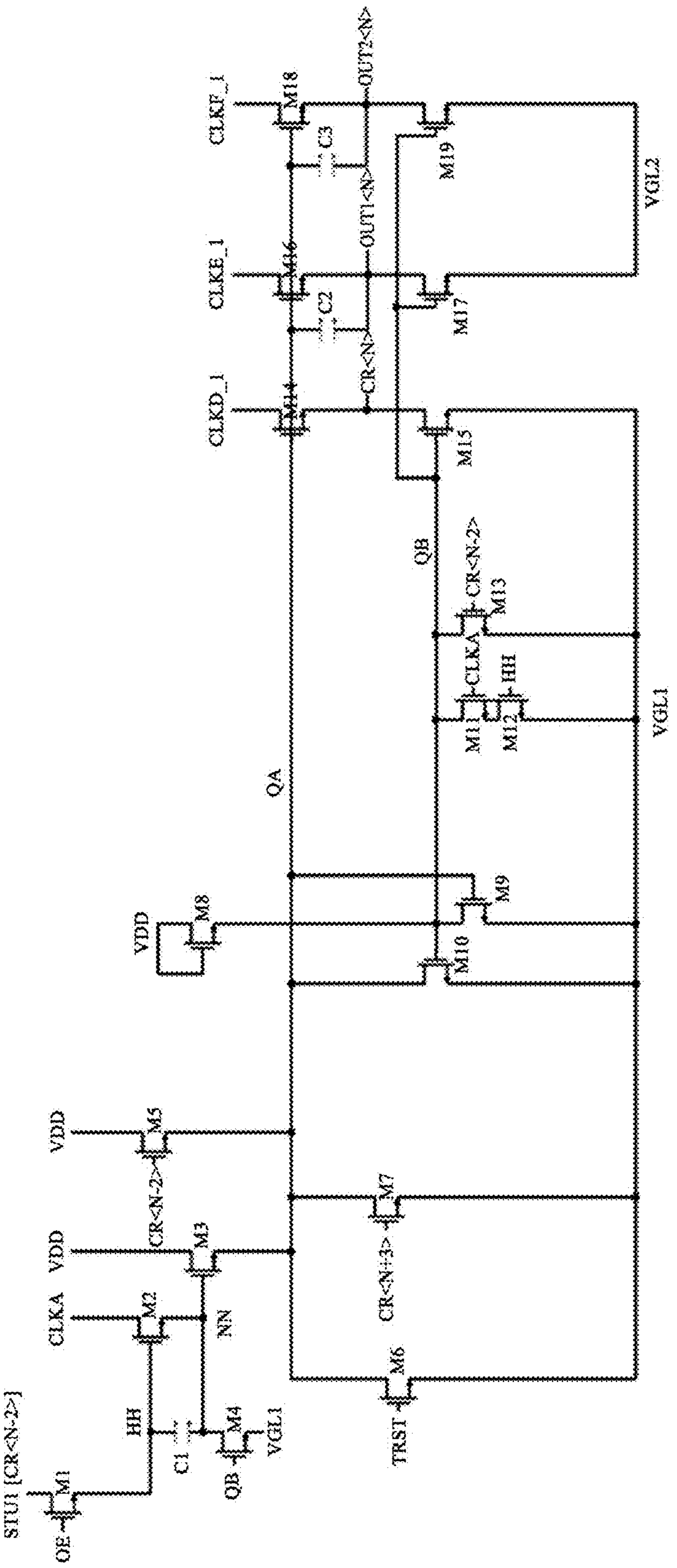
FIG. 5 is a schematic diagram showing a structure of a gate driving unit according to an embodiment of the present disclosure.

FIG. 5 is a schematic diagram showing a structure of one (e.g., the N-th gate driving unit or the gate driving unit in the N-th stage)) of N gate driving units (or gate driving units in N stages) in the gate driving circuit GOA. As shown in FIG. 5, the gate driving unit may include: a first transistor M1, a second transistor M2, a third transistor M3, a fourth transistor M4, a fifth transistor M5, a sixth transistor M6, a seventh transistor M7, an eighth transistor M8, a ninth transistor M9, a tenth transistor M10, an eleventh transistor M11, a twelfth transistor M12, a thirteenth transistor M13, a fourteenth transistor M14, a fifteenth transistor M15, a sixteenth transistor M16, a seventeenth transistor M17, an eighteenth transistor M18, a first capacitor C1, a second capacitor C2, and a third capacitor C3.

The first transistor M1 includes a control electrode coupled to a random signal terminal OE, a first electrode coupled to a signal input terminal STU1 (and the signal input terminal STU1 may be coupled to a cascade output terminal CR<N−2> of an (N−2)-th gate driving unit), and a second electrode coupled to a sensing cascade node HH. The second transistor M2 includes a control electrode coupled to the sensing cascade node HH, a first electrode coupled to a first clock signal terminal, and a second electrode coupled to a sensing precharge node NN. One terminal of the first capacitor Cl is coupled to the sensing cascade node HH, and the other terminal of the first capacitor C1 is coupled to the sensing precharge node NN. The third transistor M3 includes a control electrode coupled to the sensing precharge node NN, a first electrode coupled to a first power source terminal VDD, and a second electrode coupled to a pull-up node QA. The fourth transistor M4 includes a control electrode coupled to a pull-down node QB, a first electrode coupled to the sensing precharge node NN, and a second electrode coupled to a second power source terminal VGL1. The fifth transistor M5 includes a control electrode coupled to the cascade output terminal CR<N−2> of the (N−2)-th gate driving unit, a first electrode coupled to the first power source terminal VDD, and a second electrode coupled to the pull-up node QA. The sixth transistor M6 includes a control electrode coupled to a total reset terminal TRST, a first electrode coupled to the pull-up node QA, and a second electrode coupled to the second power source terminal VGL1. The seventh transistor M7 includes a control electrode coupled to a cascade output terminal CR<N+3> of an (N+3)-th gate driving unit, a first electrode coupled to the pull-up node QA, and a second electrode coupled to the second power source terminal VGL1. The eighth transistor M8 includes a control electrode and a first electrode both coupled to the first power source terminal VDD, and a second electrode coupled to the pull-down node QB. The ninth transistor M9 includes a control electrode coupled to the pull-up node QA, a first electrode coupled to the pull-down node QB, and a second electrode coupled to the second power source terminal VGL1. The tenth transistor M10 includes a control electrode coupled to the pull-down node QB, a first electrode coupled to the pull-up node QA, and a second electrode coupled to the second power source terminal VGL1. The eleventh transistor M11 includes a control electrode coupled to the first clock signal terminal CLKA, a first electrode coupled to the pull-down node QB, and a second electrode coupled to a first electrode of the twelfth transistor M12. The twelfth transistor M12 includes a control electrode coupled to the sensing cascade node HH, and a second electrode coupled to the second power source terminal VGL1. The thirteenth transistor M13 includes a control electrode coupled to the cascade output terminal CR<N−2> of the (N−2)-th gate driving unit, a first electrode coupled to the pull-down node QB, and a second electrode coupled to the second power source terminal VGL1. The fourteenth transistor M14 includes a control electrode coupled to the pull-up node QA, a first electrode coupled to a second clock signal line CLKD_1 to which a 1-st stage gate driving unit (i.e., the gate driving unit in a 1-st stage) is coupled, and a second electrode coupled to a cascade output terminal CR (i.e., "CR<N>" shown in FIG. 5 that indicates the cascade output terminal CR of the N-th stage gate driving unit). The fifteenth transistor M15 includes a control electrode coupled to the pull-down node QB, a first electrode coupled to the cascade output terminal CR, and a second electrode coupled to the second power source terminal VGL1. The sixteenth transistor M16 includes a control electrode coupled to the pull-up node QA, a first electrode coupled to a first driving clock signal line CLKE_1 to which the 1-st stage gate driving unit is coupled, and a second electrode coupled to a first signal output terminal OUT1 (i.e., "OUT1<N>" shown in FIG. 5 that denotes the first signal output terminal OUT1 of the N-th stage gate driving unit). The seventeenth transistor M17 includes a control electrode coupled to the pull-down node QB, a first electrode coupled to the first signal output terminal OUT1, and a second electrode coupled to a reset power source terminal VGL2. The eighteenth transistor M18 includes a control electrode coupled to the pull-up node QA, a first electrode coupled to a second driving clock signal line CLKF_1 to which the 1-st stage gate driving unit is coupled, and a second electrode coupled to a second signal output terminal OUT2 (i.e., "OUT2<N>" shown in FIG. 5 that denotes the second signal output terminal OUT2 of the N-th stage gate driving unit). A nineteenth transistor M19 includes a control electrode coupled to the pull-down node QB, a first electrode coupled to the second signal output terminal OUT2, and a second electrode coupled to the reset power source terminal VGL2. One terminal of the second capacitor C2 is coupled to the pull-up node QA, and the other terminal of the second capacitor C2 is coupled to the first signal output terminal OUT1. One terminal of the third capacitor C3 is coupled to the pull-up node QA, and the other terminal of the third capacitor C3 is coupled to the second signal output terminal OUT2.

For example, each of the transistors M1 to M19 may be an N-type transistor or a P-type transistor, which can simplify a manufacturing process thereof and can improve a product yield thereof. In an example, each of all transistors in an embodiment of the present application may be a low temperature polysilicon thin film transistor that may have a bottom gate structure or a top gate structure, considering that a leakage current of the low temperature polysilicon thin film transistor is small.

Figure 6:
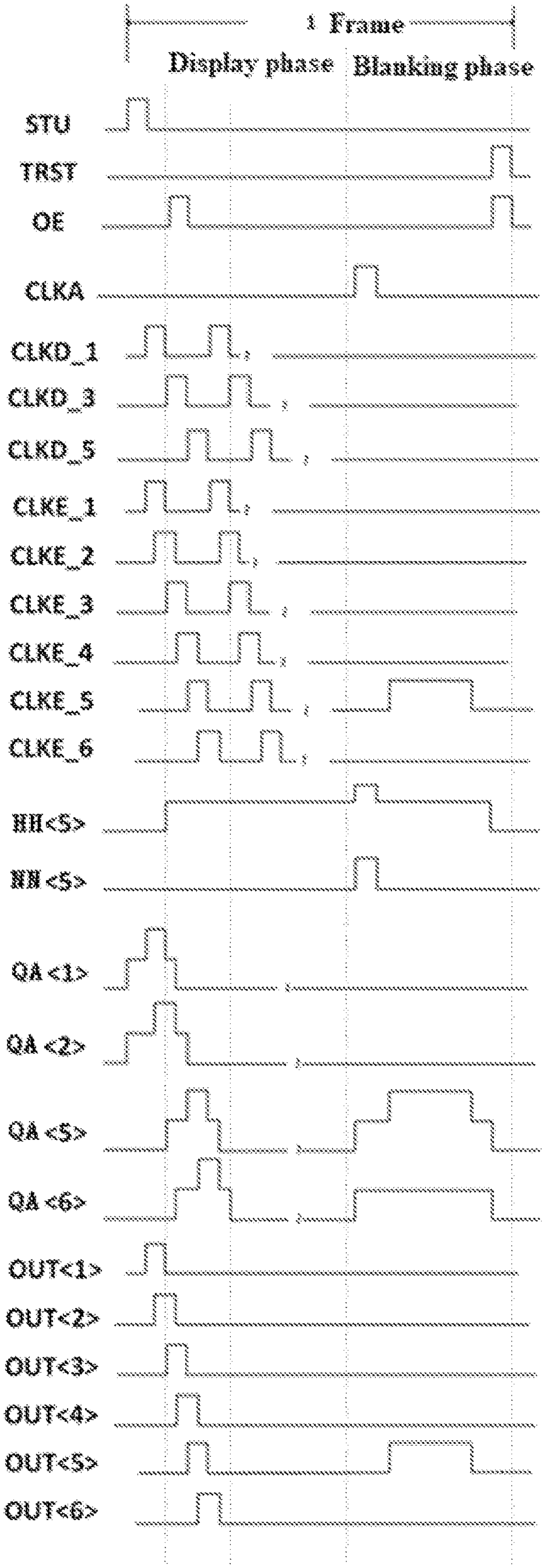
FIG. 6 is a timing diagram of the gate driving unit shown in FIG. 5.

FIG. 6 is a timing diagram of the gate driving unit shown in FIG. 5. An operation of the gate driving unit shown in FIG. 5 in each frame may include a display phase and a blanking phase, similar to the foregoing description with reference to FIG. 4. In FIG. 6, reference symbols "STU", "TRST", "OE", and "CLKA" denote levels of a frame start signal input line STU, a total reset terminal TRST or a total reset line TRST, a random signal terminal OE or a random signal line OE, and a first clock signal terminal CLKA or a first clock signal line CLKA (see FIG. 7), respectively; reference symbols "CLKD_1", "CLKD_3", and "CLKD_5" denote levels on second clock signal lines to which the 1-st, 3-rd, and 5-th stage gate driving units are coupled, respectively; reference symbols "CLKE_1" to "CLKE_6" denote levels on the first driving clock signal lines CLKE_1 to CLKE_6 (see FIG. 7) to which the 1-st to 6-th stage gate driving units are coupled, respectively; reference symbols "HH<5>" and "NN<5>" denote levels of the sensing cascade node HH and the sensing precharge node NN of the 5-th stage gate driving unit, respectively; reference symbols "QA<1>", "QA<2>", "QA<5>" and "QA<6>" denote levels of the pull-up nodes QA of the 1-st, 2-nd, 5-th and 6-th stage gate driving units, respectively; and reference symbols "OUT<1>" to "OUT<6>" denote levels of signal output terminals (including the first signal output terminal OUT1 and the second signal output terminal OUT2) of the 1-st to 6-th stage gate driving units, respectively.

In an example, the control electrodes of the display switching transistors T1 of the pixel circuits in a same row among the N rows of pixel circuits are all coupled to a same first gate line G1, and the control electrodes of the sensing switching transistors T2 of the pixel circuits in a same row among the N rows of pixel circuits are all coupled to a same second gate line G2, similar to the case shown in FIG. 2.

Figure 7:
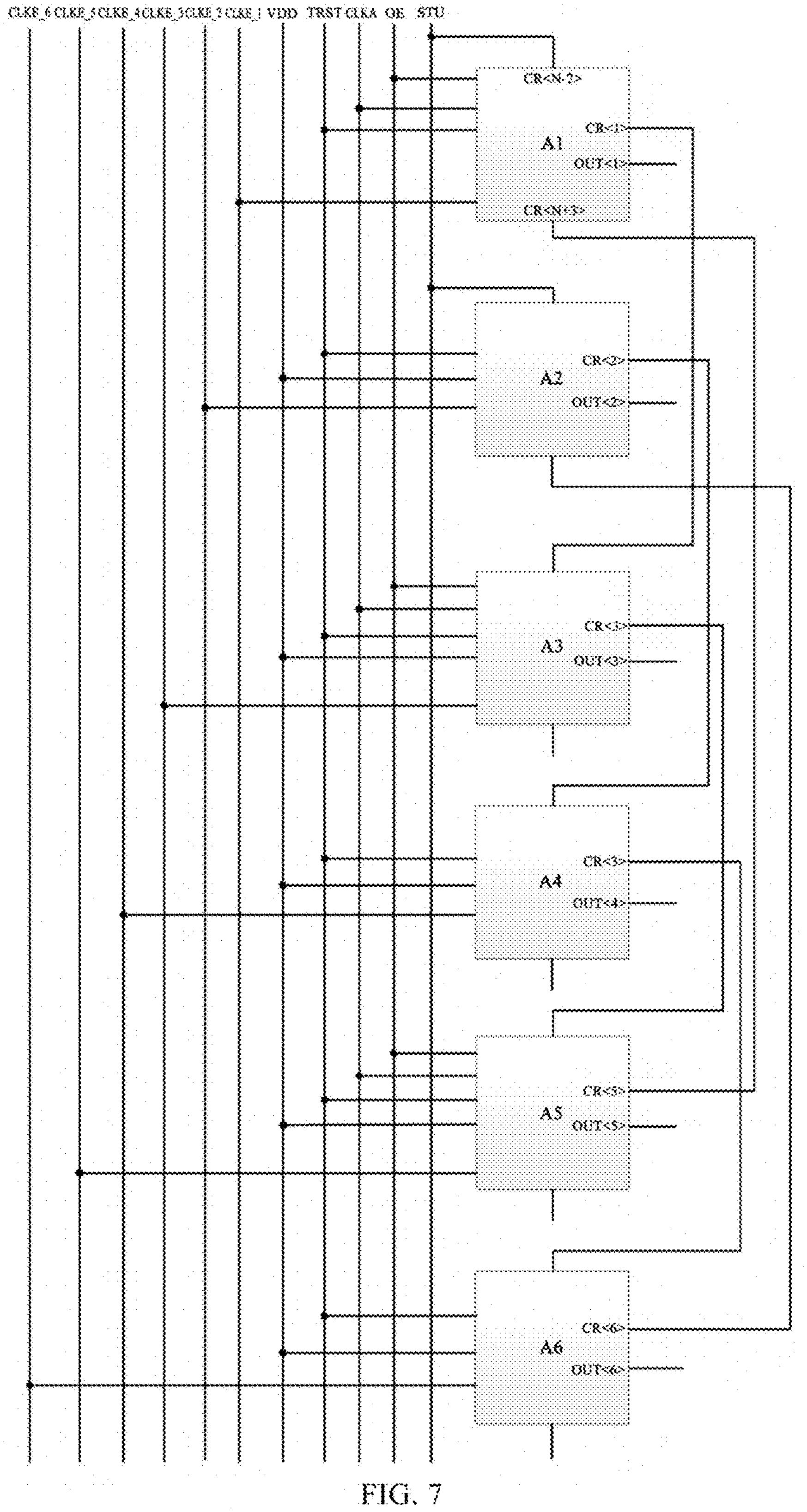
FIG. 7 is a schematic diagram showing a cascade of first six stages of gate driving units of a gate driving circuit according to an embodiment of the present disclosure.

FIG. 7 is a schematic diagram showing a cascade of the first six gate driving units A1 to A6 of the gate driving circuit GOA. In FIG. 7, the signal input terminal STU1 of the gate driving unit in each stage is shown as "CR<N−2>", and the first and second signal output terminals OUT1 and OUT2 of the gate driving unit in each stage are simply shown as "OUT<j>", where j=1, 2, 3, 4, 5, and 6. It should be noted that the structure of the gate driving unit in each stage in FIG. 7 is as shown in FIG. 5, and FIG. 7 only schematically illustrates a cascade of a plurality of gate driving units.

In an example, each of the N gate driving units includes the signal input terminal STU1, the cascade output terminal CR, the first signal output terminal OUT1, and the second signal output terminal OUT2. The signal input terminal STU1 of each of the gate driving units in the first and second stages is coupled to the frame start signal input line STU, and the signal input terminal of the gate driving unit in the i-th stage is coupled to the cascade output terminal CR of the gate driving unit in the (i−2)-th stage; further, the first and second signal output terminals OUT1 and OUT2 of each of the N gate driving units are coupled to the first and second gate lines G1 and G2 of the pixel circuits in a corresponding row, respectively, where 3≤i≤N.

Figure 8:
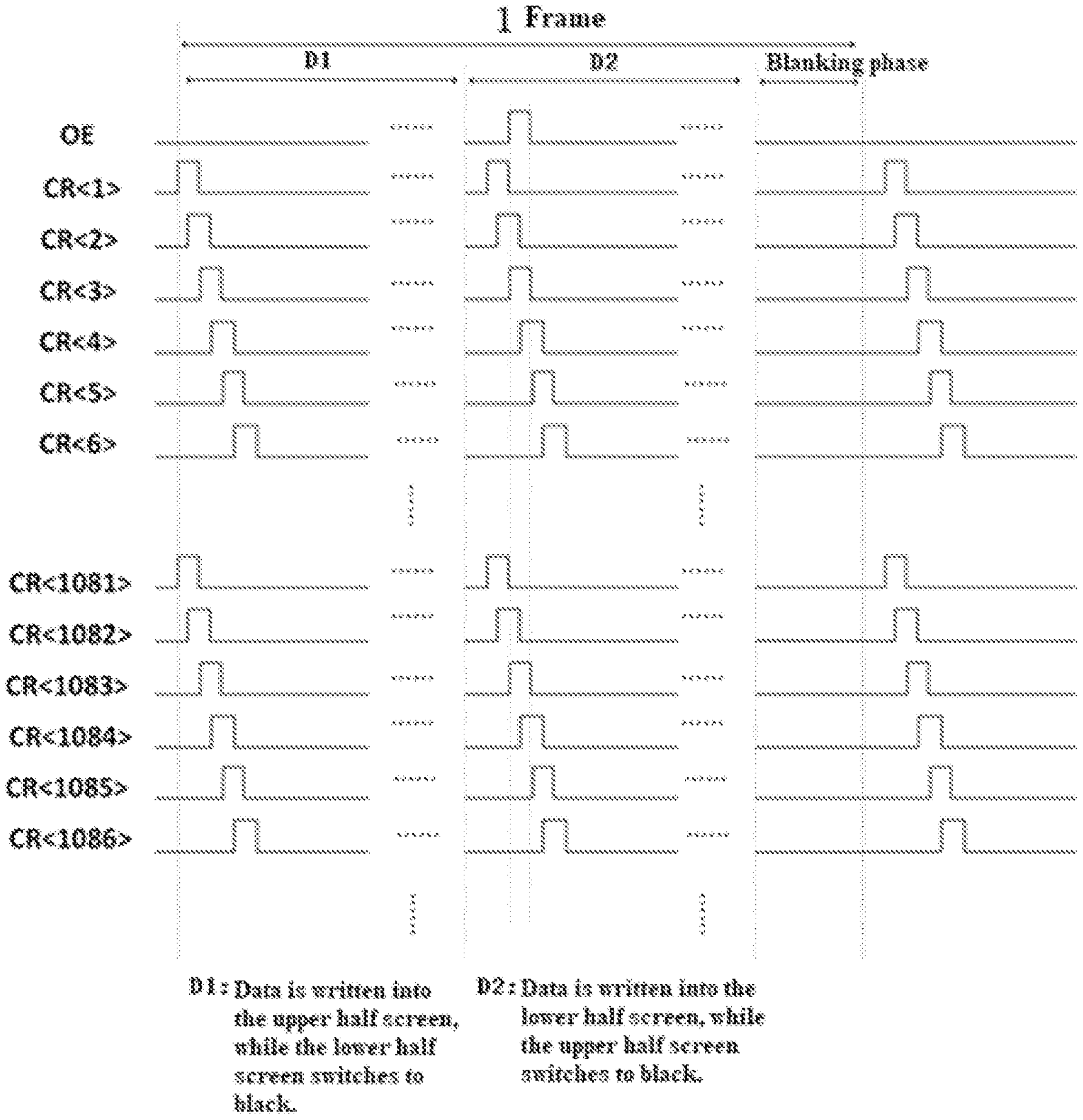
FIG. 8 is a timing diagram of a gate driving circuit according to an embodiment of the present disclosure.

FIG. 8 is a timing diagram of the gate driving unit shown in FIG. 5. In FIG. 8, taking the resolution of 4K (i.e., M=4096, and N=2160) as an example, reference symbol "OE" represents the level of the random signal terminal OE, reference symbols "CR<1>" to "CR<6>" represent the levels of the cascade output terminals CR of the 1-st to 6-th stage gate driving units, respectively, and reference symbols "CR<1081>" to "CR<1086>" represent the levels of the cascade output terminals CR of the 1081-st to 1086-th stage gate driving units, respectively. As can be seen from FIG. 8, in one frame, an operation of each gate driving unit includes a display phase (which may last ½ frame and includes a first display phase D1 and a second display phase D2) and a blanking phase (which may last ½ frame). In the first display phase D1, the driving units (e.g., the 1-st to 6-th stage gate driving units, i.e., the gate driving units in the 1-st to 6-th stages) coupled to the upper half screen may cause data to be written into the rows of pixel circuits located in the upper half screen, during which the driving units (e.g., the 1081-st to 1086-th stage gate driving units, i.e., the gate driving units in the 1081-st to 1086-th stages) coupled to the lower half screen may cause pixels in the rows of pixel circuits located in the lower half screen not to emit light thereby displaying a black picture (i.e., to switch to a black picture, which may be simply referred to as "switching to black"). In the second display phase D2, the driving units (e.g., the 1081-st to 1086-th stage gate driving units) coupled to the lower half screen may cause data to be written into the rows of pixel circuits located in the lower half screen, during which the driving units (e.g., the 1-st to 6-th stage gate driving units) coupled to the upper half screen may cause pixels in the rows of pixel circuits located in the upper half screen not to emit light thereby displaying a black picture (i.e., to switch to a black picture, which may be simply referred to as "switching to black").

Figure 9:
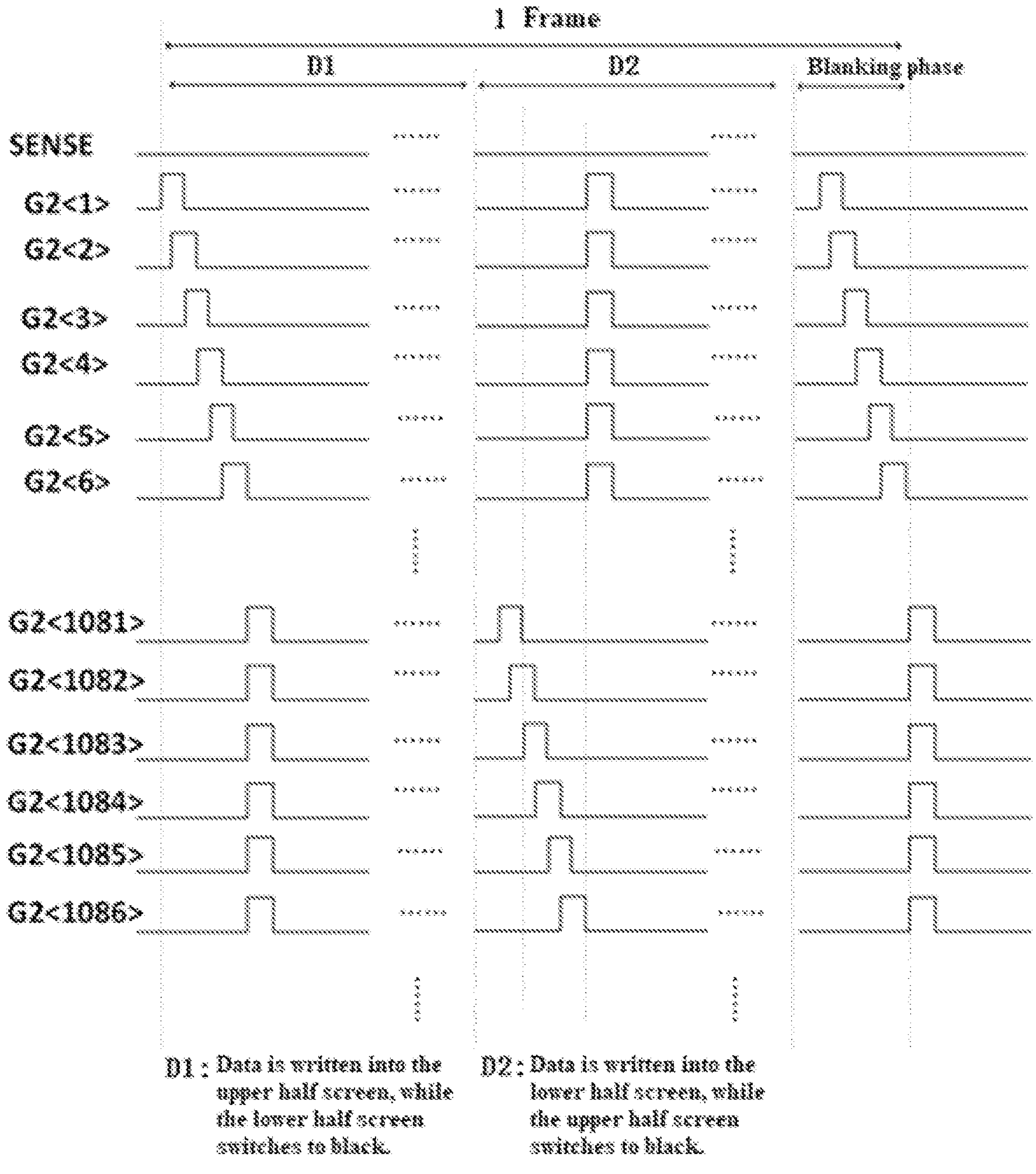
FIG. 9 is a schematic diagram of a display panel writing data in one of an upper half screen (or upper half panel) and a lower half screen (or lower half panel) of the display panel, and at the same time writing black data in the other of the upper half screen and the lower half screen, according to an embodiment of the present disclosure.

FIG. 9 is a schematic diagram of the display panel writing data in one of the upper half screen and the lower half screen of the display panel, and at the same time writing black data in the other of the upper half screen and the lower half screen, according to an embodiment of the present disclosure.

In FIG. 9, taking the resolution of 4K (i.e., M=4096, and N=2160) as an example, reference symbol "SENSE" represents the level of the second signal sensing line SENSE2, reference symbols "G2<1>" to "G2<6>" represent the levels of the second gate lines G2 of the 1-st to 6-th rows of pixel circuits (i.e., the rows of pixel circuits located in the upper half screen), respectively, and reference symbols "G2<1081>" to "G2<1086>" represent the levels of the second gate lines G2 of the 1081-st to 1086-th rows of pixel circuits (i.e., the rows of pixel circuits located in the lower half screen), respectively. As can be seen from FIG. 9, in one frame, an operation of the display panel includes a display phase (which may last ½ frame and include a first display phase D1 and a second display phase D2) and a blanking phase (which may last ½ frame). In the first display phase D1, data is written into the rows of pixel circuits in the upper half screen (i.e., an image to be displayed is displayed in the upper half screen), during which (or at the same time) the pixels in the rows of pixel circuits in the lower half screen do not emit light thereby displaying a black picture (i.e., switch to a black picture, which may be simply referred to as "switching to black"). In the second display phase D2, data is written into the pixel circuits in the rows located in the lower half screen (i.e., an image to be displayed is displayed in the lower half screen), during which (or at the same time) the pixels in the pixel circuits in the rows located in the upper half screen do not emit light thereby displaying a black picture (i.e., switch to a black picture, which may be simply referred to as "switching to black"). Thus, the MPRT of the display panel can be improved by shortening the light emitting time duration of each pixel without increasing the refresh frequency of the display panel, thereby effectively mitigating the moving picture ghosting.

Embodiments of the present disclosure provide a method for driving the display panel. As described above, the 1-st to (N/2)-th rows of pixel circuits of the N rows of pixel circuits are located in the upper half screen, and the ((N/2)+1)-th to N-th rows of pixel circuits of the N rows of pixel circuits are located in the lower half screen. The method may include a step of: supplying a turn-on level to the first gate line G1 and the second gate line G2 of each row of pixel circuits in one of the upper half screen and the lower half screen, respectively, to turn on both the display switching transistor T1 and the sensing switching transistor T2, so that a data voltage supplied from the data line DATA is input to the control electrode of the driving transistor T3 via the display switching transistor T1, and a low level supplied from a corresponding one of the first signal sensing line SENSE1 and the second signal sensing line SENSE2 is input to the second electrode of the driving transistor T3. The method may further include a step of: supplying a turn-off level to the first gate line G1 and the second gate line G2 of each row of pixel circuits in the one of the upper half screen and the lower half screen, respectively, to turn off both the display switching transistor T1 and the sensing switching transistor T2, thereby causing the organic light emitting diodes OLED to start light emission. The method may further include a step of: while the turn-on level is supplied to the first gate line G1 and the second gate line G2 of each row of pixel circuits in the one of the upper half screen and the lower half screen, supplying a turn-on level to the first gate line G1 and the second gate line G2 of each row of pixel circuits in the other of the upper half screen and the lower half screen, respectively, so that a data voltage VDATA supplied from the data line DATA is input to the control electrode of the driving transistor T3 via the display switching transistor T1, and a reference voltage VREF provided by a corresponding one of the first and second signal sensing lines SENSE1 and SENSE2 is input to the second electrode of the driving transistor T3, where the reference voltage VREF is higher than the data voltage VDATA to make the organic light emitting diodes OLED of the rows of pixel circuits in the other one of the upper half screen and the lower half screen not emit light.

As described above, each of the display switching transistor T1, the driving transistor T3, and the sensing switching transistor T2 may be an N-type transistor. In this case, the turn-on level is a high level, and the turn-off level is a low level.

As described above, FIG. 10 is a schematic diagram showing a structure of a display device including the display panel. The structure of the display panel is as described above. In addition, the display panel includes a display region AA and a non-display region NA. The pixel array is located in the display region AA, and the gate driving circuit may be located in the non-display region NA. The display device may include, in addition to the display panel, a controller CTRL and a data driver D-DRIVER. The controller CTRL may be a general-purpose Central Processing Unit (CPU), an Application Processor (AP), an integrated circuit having the functions disclosed in the present disclosure, or the like, and may provide a data control signal and a gate driving signal to the data driver D-DRIVER and the gate driving circuit GOA, respectively, so as to implement the functions of the display panel described above and effectively mitigate the moving picture ghosting. The controller CTRL may be coupled to the data driver D-DRIVER and the gate driving circuit GOA, respectively. The data driver D-DRIVER may be coupled to the pixel array PXL-ARRAY through the data line DATA, the first signal sensing line SENSE1, and the second signal sensing line SENSE2. The gate driving circuit GOA may be coupled to the pixel array PXL-ARRAY through a plurality of gate lines. The plurality of gate lines may be in one-to-one correspondence with the N gate driving units of the gate driving circuit GOA, and each of the plurality of gate lines may include the first gate line G1 and the second gate line G2. As such, the MPRT of the display device can be improved by shortening a light emitting time duration of each pixel without increasing the refresh frequency of the display panel thereof, thereby effectively mitigating the moving picture ghosting.

It is to be understood that the foregoing embodiments of the disclosure may be combined with each other in a case of no explicit conflict.

It should be noted that the above embodiments are merely exemplary embodiments employed to illustrate the principles of the present disclosure, and the present disclosure is not limited thereto. It will be apparent to one of ordinary skill in the art that various changes and modifications may be made without departing from the scope of the present disclosure as defined in the appended claims, and such changes and modifications also fall within the scope of the present disclosure.

What is claimed is:

1. A method for driving a pixel circuit array, wherein the pixel circuit array comprises:

a first signal sensing line and a second signal sensing line; and

N pixel circuits arranged in a column;

wherein all of the N pixel circuits are divided into a first group and a second group, each pixel circuit in the first group is coupled to the first signal sensing line, and each pixel circuit in the second group is coupled to the second signal sensing line different from the first signal sensing line, where N is a positive integer greater than 1; and wherein the first group and the second group are respectively located in a first region and a second region that do not overlap each other, the first signal sensing line extends only through the first region, the second signal sensing line extends only through the second region, and the first signal sensing line and the second signal sensing line are aligned with each other in a column direction of the N pixel circuits;

wherein the first group comprises 1-st to (N/S)-th pixel circuits of the N pixel circuits, and the second group comprises ((N/S)+1)-th to N-th pixel circuits of the N pixel circuits, wherein S is a factor of N;

wherein N is an even number, and S is equal to 2;

wherein each of the N pixel circuits comprises a light emitting device and a light emission control circuit, and the light emission control circuit is configured to control the light emitting device to emit light or not, wherein the light emitting device is an organic light emitting diode, wherein the light emission control circuit comprises a display switching transistor, a driving transistor, a sensing switching transistor, and a storage capacitor which are coupled together, and wherein each of the display switching transistor, the driving transistor, and the sensing switching transistor comprises a control electrode, a first electrode, and a second electrode, the second electrode of the display switching transistor is coupled to the control electrode of the driving transistor, the first electrode of the driving transistor is configured to be coupled to a high level terminal, the second electrode of the driving transistor is coupled to the first electrode of the sensing switching transistor, and the second electrode of the sensing switching transistor is coupled to the first signal sensing line or the second signal sensing line;

wherein a first terminal of the storage capacitor is coupled to the second electrode of the display switching transistor and the control electrode of the driving transistor, respectively, a second terminal of the storage capacitor is coupled to the second electrode of the driving transistor, the first electrode of the sensing switching transistor, and an anode of the organic light emitting diode, respectively, and a cathode of the organic light emitting diode is configured to be coupled to a low level terminal;

wherein the pixel circuit array further comprises a data line, a first gate line, and a second gate line, wherein the first electrode of the display switching transistor is coupled to the data line, the control electrode of the display switching transistor is coupled to the first gate line, and the control electrode of the sensing switching transistor is coupled to the second gate line;

wherein each of the display switching transistor, the driving transistor, and the sensing switching transistor is an N-type transistor or a P-type transistor; and the 1-st to (N/2)-th pixel circuit are located in an upper half screen, the ((N/2)+1)-th to N-th pixel circuits are located in a lower half screen, and the method comprises:

providing a turn-on level to the first gate line and the second gate line of each pixel circuit in one of the upper half screen and the lower half screen, respectively, to turn on both the display switching transistor and the sensing switching transistor, so as to input a data voltage provided by the data line to the control electrode of the driving transistor via the display switching transistor, and to input a low level provided by a corresponding one of the first signal sensing line and the second signal sensing line to the second electrode of the driving transistor;

providing a turn-off level to the first gate line and the second gate line of each pixel circuit in the one of the upper half screen and the lower half screen, respectively, to turn off both the display switching transistor and the sensing switching transistor, thereby causing the organic light emitting diode to start light emission; and during providing the turn-on level to the first gate line and the second gate line of each pixel circuit in the one of the upper half screen and the lower half screen, respectively, providing a turn-on level to the first gate line and the second gate line of each pixel circuit in the other of the upper half screen and the lower half screen to allow the data voltage provided by the data line to be input to the control electrode of the driving transistor via the display switching transistor, and allow a reference voltage provided by a corresponding one of the first and second signal sensing lines to be input to the second electrode of the driving transistor, wherein the reference voltage is higher than the data voltage to make the organic light emitting diode of each pixel circuit in the other of the upper half screen and the lower half screen not emit light.

2. The method according to claim 1, wherein each of the display switching transistor, the driving transistor, and the sensing switching transistor is an N-type transistor, the turn-on level is a high level, and the turn-off level is a low level.

3. The method according to claim 1, wherein the first group comprises the pixel circuits in odd rows of the N pixel circuits, and the second group comprises the pixel circuits in even rows of the N pixel circuits, where N is an even number.

4. The method according to claim 1, wherein each of the first signal sensing line and the second signal sensing line extends through a region in which all of the N pixel circuits are located.

5. The method according to claim 4, wherein each of the N pixel circuits comprises a light emitting device and a light emission control circuit, and the light emission control circuit is configured to control the light emitting device to emit light or not.

6. The method according to claim 5, further comprising a data line, a first gate line, and a second gate line, wherein the first electrode of the display switching transistor is coupled to the data line, the control electrode of the display switching transistor is coupled to the first gate line, and the control electrode of the sensing switching transistor is coupled to the second gate line.

7. The method according to claim 1, wherein the first signal sensing line extends through a region in which the 1-st to (N/S)-th pixel circuits are located, and the second signal sensing line extends through a region in which the ((N/S)+1)-th to N-th pixel circuit are located.

8. The method according to claim 7, wherein the light emitting device is an organic light emitting diode.

9. The method according to claim 8, wherein each of the display switching transistor, the driving transistor, and the sensing switching transistor is an N-type transistor or a P-type transistor.

10. A method for driving a display panel, wherein the display panel comprises a gate driving circuit and M pixel circuit arrays, wherein each of the M pixel circuit arrays comprises a first signal sensing line and a second signal sensing line; and N pixel circuits arranged in a column, wherein all of the N pixel circuits are divided into a first group and a second group, each pixel circuit in the first group is coupled to the first signal sensing line, and each pixel circuit in the second group is coupled to the second signal sensing line different from the first signal sensing line, where N is a positive integer greater than 1; and wherein the first group and the second group are respectively located in a first region and a second region that do not overlap each other, the first signal sensing line extends only through the first region, the second signal sensing line extends only through the second region, and the first signal sensing line and the second signal sensing line are aligned with each other in a column direction of the N pixel circuits, and the M pixel circuit arrays comprise M columns of pixel circuits and N rows of pixel circuits, M being a positive integer, wherein the gate driving circuit is configured to: drive the pixel circuits in the second group not to emit light during driving the pixel circuits in the first group to display an image; or drive the pixel circuits in the first group not to emit light during driving the pixel circuits in the second group to display an image;

wherein N is an even number, and the gate driving circuit is configured to: drive the pixel circuits in ((N/2)+1)-th to N-th rows not to emit light during driving the pixel circuits in 1-st to (N/2)-th rows to display the image; or drive the pixel circuits in 1-st to (N/2)-th rows not to emit light during driving the pixel circuits in ((N/2)+1)-th to N-th rows to display the image;

wherein the gate driving circuit comprises N gate driving units cascaded together, the N gate driving units are in one-to-one correspondence with the N rows of pixel circuits, and the N gate driving units are coupled to the N rows of pixel circuits, respectively;

wherein the control electrodes of the display switching transistors of the pixel circuits in a same row of the N rows of pixel circuits are all coupled to a same first gate line, and the control electrodes of the sensing switching transistors of the pixel circuits in a same row of the N rows of pixel circuits are all coupled to a same second gate line;

wherein each of the N gate driving units comprises a signal input terminal, a cascade output terminal, a first signal output terminal, and a second signal output terminal; and the signal input terminal of each of the gate driving unit in a first stage and the gate driving unit in a second stage is coupled to a frame start signal input line, the signal input terminal of the gate driving unit in an i-th stage is coupled to the cascade output terminal of the gate driving unit in an (i−2)-th stage, and the first signal output terminal and the second signal output terminal of each of the N gate driving units are coupled to the first gate line and the second gate line of each pixel circuit in a corresponding row, where $3 \leq i \leq N$; and the 1-st to (N/2)-th rows of pixel circuits of the N rows of pixel circuits are located in an upper half screen, the ((N/2)+1)-th to N-th rows of pixel circuits of the N rows of pixel circuits are located in a lower half screen, and the method comprises:

providing a turn-on level to the first gate line and the second gate line of each row of pixel circuits in one of the upper half screen and the lower half screen, respectively, to turn on both the display switching transistor and the sensing switching transistor, so as to input a data voltage provided by the data line to the control electrode of the driving transistor via the display switching transistor, and to input a low level provided by a corresponding one of the first signal sensing line and the second signal sensing line to the second electrode of the driving transistor;

providing a turn-off level to the first gate line and the second gate line of each row of pixel circuits in the one of the upper half screen and the lower half screen, respectively, to turn off both the display switching transistor and the sensing switching transistor, thereby causing the organic light emitting diode to start light emission; and during providing the turn-on level to the first gate line and the second gate line of each row of pixel circuits in the one of the upper half screen and the lower half screen, respectively, providing a turn-on level to the first gate line and the second gate line of each row of pixel circuits in the other of the upper half screen and the lower half screen, respectively, to allow the data voltage provided by the data line to be input to the control electrode of the driving transistor via the display switching transistor, and allow a reference voltage provided by a corresponding one of the first and second signal sensing lines to be input to the second electrode of the driving transistor, wherein the reference voltage is higher than the data voltage to make the organic light emitting diodes of a respective row of pixel circuits in the other of the upper half screen and the lower half screen not emit light.

11. The method according to claim 10, wherein each of the display switching transistor, the driving transistor, and the sensing switching transistor is an N-type transistor, the turn-on level is a high level, and the turn-off level is a low level.

12. The method according to claim 11, wherein N is an even number, and S is equal to 2.

13. The method according to claim 12, wherein a first terminal of the storage capacitor is coupled to the second electrode of the display switching transistor and the control electrode of the driving transistor, respectively, a second terminal of the storage capacitor is coupled to the second electrode of the driving transistor, the first electrode of the sensing switching transistor, and an anode of the organic light emitting diode, respectively, and a cathode of the organic light emitting diode is configured to be coupled to a low level terminal.

14. The method according to claim 11, wherein the first signal sensing line extends through a region in which the 1-st to (N/S)-th pixel circuits are located, and the second signal sensing line extends through a region in which the ((N/S)+1)-th to N-th pixel circuit are located.

15. The method according to claim 10, wherein the first group comprises 1-st to (N/S)-th pixel circuits of the N pixel circuits, and the second group comprises ((N/S)+1)-th to N-th pixel circuits of the N pixel circuits, wherein S is a factor of N.

16. The method according to claim 15, wherein the light emission control circuit comprises a display switching transistor, a driving transistor, a sensing switching transistor, and a storage capacitor which are coupled together.

17. The method according to claim 10, wherein the first group comprises the pixel circuits in odd rows of the N pixel circuits, and the second group comprises the pixel circuits in even rows of the N pixel circuits, where N is an even number.

18. The method according to claim 17, wherein each of the display switching transistor, the driving transistor, and the sensing switching transistor comprises a control electrode, a first electrode, and a second electrode, the second electrode of the display switching transistor is coupled to the control electrode of the driving transistor, the first electrode of the driving transistor is configured to be coupled to a high level terminal, the second electrode of the driving transistor is coupled to the first electrode of the sensing switching transistor, and the second electrode of the sensing switching transistor is coupled to the first signal sensing line or the second signal sensing line.

19. The method according to claim 10, wherein each of the first signal sensing line and the second signal sensing line extends through a region in which all of the N pixel circuits are located.

* * * * *